US012411803B2

(12) United States Patent
Heinz (10) Patent No.: US 12,411,803 B2
(45) Date of Patent: Sep. 9, 2025

(54) SYSTEMS AND/OR METHODS FOR DYNAMIC ADAPTATION OF DATA RETENTION POLICIES FOR IOT PLATFORMS

(71) Applicant: Cumulocity GmbH, Düsseldorf (DE)

(72) Inventor: Christoph Heinz, Weimar (DE)

(73) Assignee: Cumulocity GmbH, Düsseldorf (DE)

( * ) Notice: Subject to any disclaimer, the term of this patent is extended or adjusted under 35 U.S.C. 154(b) by 0 days.

(21) Appl. No.: 18/380,002

(22) Filed: Oct. 13, 2023

(65) Prior Publication Data

US 2024/0152487 A1    May 9, 2024

(30) Foreign Application Priority Data

Nov. 3, 2022 (EP) .................................... 22205405

(51) Int. Cl.
   *G06F 16/00* (2019.01)
   *G06F 11/34* (2006.01)
   (Continued)

(52) U.S. Cl.
   CPC ........ *G06F 16/125* (2019.01); *G06F 11/3419* (2013.01); *G06F 16/113* (2019.01);
   (Continued)

(58) Field of Classification Search
   CPC .. G06F 16/217; G06F 16/221; G06F 16/2329; G06F 16/2453; G06F 16/24564;
   (Continued)

(56) References Cited

U.S. PATENT DOCUMENTS

| | | | |
|---|---|---|---|
| 7,577,679 B2 * | 8/2009 | Sinclair | G06F 16/221 |
| | | | 707/999.102 |
| 10,089,362 B2 | 10/2018 | Cammert et al. | |

(Continued)

FOREIGN PATENT DOCUMENTS

| | | | |
|---|---|---|---|
| WO | WO2007046829 A2 * | 4/2007 | |
| WO | WO2014085677 A2 * | 6/2014 | |

(Continued)

OTHER PUBLICATIONS

Chao Zhang et al., "Intelligent Internet of things service based on artificial intelligence technology", 2021 IEEE 2nd International Conference on Big Data, Artificial Intelligence and Internet of Things Engineering (ICBAIE), Mar. 2021, pp. 731-734.*

(Continued)

*Primary Examiner* — Srirama Channavajjala
(74) *Attorney, Agent, or Firm* — Nixon & Vanderhye P.C.

(57) ABSTRACT

Data storage management is carried out by an Internet of Things platform having access to operational and long-term databases carrying tables for storing device-related data emitted from connected devices. Device-related data is received and stored in operational database table entries. Tables are associated with devices. Table entries are associated with entry dates. A table in the operational database is monitored to obtain load statistics. Data from the operational database is offloaded by replication to the long-term database. Queries against operational database tables are tracked to obtain query statistics. Cleanup rules determining timeframes within which data stored in operational database table entries are to be deleted are set up, based on a date of data entry. Cleanup rules currently set up are carried out as a retention run, based on the load statistics and/or query statistics.

19 Claims, 3 Drawing Sheets

(51) Int. Cl.
  *G06F 16/11* (2019.01)
  *G06F 16/21* (2019.01)
  *G06F 16/22* (2019.01)
  *G06F 16/23* (2019.01)
  *G06F 16/2453* (2019.01)
  *G06F 16/2455* (2019.01)
  *G06F 16/2458* (2019.01)
  *G06F 16/25* (2019.01)

(52) U.S. Cl.
  CPC .......... *G06F 16/217* (2019.01); *G06F 16/221* (2019.01); *G06F 16/2329* (2019.01); *G06F 16/2453* (2019.01); *G06F 16/24564* (2019.01); *G06F 16/2471* (2019.01); *G06F 16/254* (2019.01)

(58) Field of Classification Search
  CPC .. G06F 16/2471; G06F 16/254; G06F 16/258; G06F 16/27; G06F 16/278; G06F 16/283
  See application file for complete search history.

(56) References Cited

U.S. PATENT DOCUMENTS

| | | | | |
|---|---|---|---|---|
| 10,176,435 | B1* | 1/2019 | Sarkar | G06N 20/00 |
| 10,216,793 | B2* | 2/2019 | Ji | G06F 16/24542 |
| 10,268,710 | B2* | 4/2019 | Hu | G06F 16/217 |
| 10,909,140 | B2* | 2/2021 | Miller | G06F 16/26 |
| 10,958,536 | B2 | 3/2021 | Shemer et al. | |
| 11,115,793 | B2 | 9/2021 | Raman | |
| 11,232,478 | B2* | 1/2022 | Brown | G06Q 30/0246 |
| 11,301,419 | B2 | 4/2022 | Liu et al. | |
| 11,308,066 | B1* | 4/2022 | Li | G06F 16/278 |
| 11,580,107 | B2* | 2/2023 | Pal | G06F 9/5077 |
| 2003/0041055 | A1* | 2/2003 | Nakamura | G06F 16/284 |
| 2004/0128314 | A1* | 7/2004 | Katibah | G06F 16/29 |
| 2005/0086246 | A1* | 4/2005 | Wood | G06F 16/21 |
| 2005/0256829 | A1* | 11/2005 | Yang | G06F 11/1469 714/E11.122 |
| 2009/0216709 | A1* | 8/2009 | Cheng | G06F 16/2453 |
| 2015/0149441 | A1* | 5/2015 | Nica | G06F 16/24542 707/719 |
| 2016/0283503 | A1* | 9/2016 | Parikh | G06F 16/2282 |
| 2017/0075954 | A1* | 3/2017 | Alpers | G06F 16/2455 |
| 2017/0364590 | A1* | 12/2017 | Hill | G06F 16/283 |
| 2019/0102411 | A1 | 4/2019 | Hung et al. | |
| 2020/0128114 | A1* | 4/2020 | Kloberdans | H04L 69/16 |
| 2020/0301941 | A1* | 9/2020 | Wilson | G06F 16/252 |
| 2020/0334254 | A1* | 10/2020 | Arye | G06F 16/2393 |
| 2020/0334730 | A1* | 10/2020 | Westlake | G06N 20/00 |
| 2021/0240347 | A1 | 8/2021 | Lee et al. | |
| 2022/0188304 | A1* | 6/2022 | Samal | G10L 15/22 |
| 2023/0231860 | A1* | 7/2023 | Tian | G06N 5/022 726/1 |

FOREIGN PATENT DOCUMENTS

| | | | |
|---|---|---|---|
| WO | WO2018039529 | A1 * | 3/2018 |
| WO | WO 2022081128 | A1 * | 4/2022 |
| WO | WO 2022124596 | A1 * | 6/2022 |

OTHER PUBLICATIONS

Melanie Lourens et al., "Database Management Difficulties in the Internet of Things", 5th International Conference on Contemporary Computing and Informatics (IC3I) (2022, pp. 322-326).*

Songfang Shi, "Research on Automatic Statistics of Electronic Commerce Data Based on Internet of Things", 2019 International Conference on Intelligent Transportation, Big Data & Smart City (ICITBS) (Jan. 2019, pp. 360-364).*

Qiang Zhu et al., "Piggyback Statistics Collection for Query Optimization Towards a Self-Maintaining Database Management System", The Computer Journal ( vol. 47, Issue: 2, Jan. 2004).*

N. Bruno et al., "Efficient creation of statistics over query expressions", Proceedings 19th International Conference on Data Engineering (Cat. No. 03CH37405), Mar. 2003, pp 201-212.*

Mar. 14, 2023 Search Report issued in European Patent Application No. 22205405, pp. 1-3.

Mervat Abu-Elkheir et al., "Data Management for the Internet of Things: Design Primitives and Solution," Sensors 2013; Nov. 14, 2013; vol. 13; No. 11; pp. 11582-15612.

Anonymous, "Internet of things—Wikipedia," Nov. 5, 2018; URL: https://en.wikipedia.org/w/index.php?title=Internet_of_things&oldid=867354411 whole document.

Muhammad Anwar, "How to install Oracle 12c Multitenant Pluggable Databases," Feb. 24, 2012, pp. 1-15.

* cited by examiner

SYSTEMS AND/OR METHODS FOR DYNAMIC ADAPTATION OF DATA RETENTION POLICIES FOR IOT PLATFORMS

CROSS-REFERENCE TO RELATED APPLICATION

This application claims the benefit of European Patent Application No. EP22205405.8 filed on Nov. 3, 2022, the entire contents of which are hereby incorporated herein by reference.

TECHNICAL FIELD

Certain example embodiments relate to data storage management. More particularly, certain example embodiments relate to technique for managing data stored across multiple storage facilities by an Internet of Things platform.

BACKGROUND AND SUMMARY

The Internet of Things (IoT) refers to an ever-growing network of physical objects. These objects are equipped with sensors, algorithms, and processing capabilities so that they can connect and interact with each other via a network. These connected objects are becoming omni-present in a variety of environments, including for example hospital beds, thermostats in smart homes, position trackers in vehicles, capsule dispensers in coffee machines, status monitors in wind turbines, etc.

With the ability of those devices to emit status and other information, counterpart IoT platforms are used for further processing. Such an IoT platform is typically designed to connect to a multitude of devices and to continuously receive and process device status data. An IoT platform typically forms the base layer for IoT applications that leverage the device data. IoT applications include for example alerting in case of a machine failure, predicting a maintenance window for a machine, triggering a supply chain related operation if a machine runs out of resources, monitoring a cool chain for the transport of perishable goods, etc.

The underlying use cases of IoT applications typically rely on different timeframes of data. Alerting use cases often rely on the most recent data, covering the last seconds or minutes of device data. Predictive maintenance use cases often rely on data from the last months or even years. Reporting use cases often rely on data from the last days or weeks. Therefore, an IoT platform serving those requests needs to manage and store device data properly so that the data availability as well as performance requirements of follow-up applications are met.

Unfortunately, however, as those skilled in the art will appreciate, an IoT platform typically cannot store all incoming data "forever" in an internal database due to performance and other technology-related operational reasons. The amount of data being stored typically determines the storage and performance needs of the IoT platform. IoT use cases oftentimes must deal with a large number of devices (e.g., sometimes in the 10s of thousands), which produce in sum gigabytes of data per week. More challenging use-cases even must deal with a seven-digit number of devices or more, producing terabytes of data per week. The more data the platform must keep, the greater the storage requirements and the greater the load that the platform must be equipped to handle. Additionally, a severe risk is that the storage capacities are approached and the platform may reject incoming data or fail to operate correctly.

IoT platforms can utilize data retention policies defining how long data is stored in their internal databases. Additional storage layers can be used to guarantee that all relevant data is stored and accessible. Improper data retention policies leading to huge amounts of data to be stored, however, can adversely affect the operational costs of an IoT platform, its stability, as well as its performance. Most often, an operations team is in charge of manually defining and adjusting the retention policies so that the requirements of follow-up applications are met. An IoT platform must deal with highly variable setups as new devices are connected, devices produce more data, or new IoT applications impose new requirements on the available data. These changes may directly affect the retention policies and require the operations team to adapt the policies to ensure a stable platform being run efficiently. As often with manual intervention, there is the risk that the manual setting of the policies will not provide the best fit.

To provide follow-up applications access to long-term data, an IoT platform can pursue a layered storage approach. In a typical setup, a high-speed operational database resides within the platform and stores all incoming device data, while the platform is additionally connected to a data lake that serves as long-term archive. The platform regularly offloads data from the operational database and stores it in the data lake. Regarding the costs, the operational database often needs to reside for performance reasons on high-speed solid state disks (SSDs). In contrast, data lake storage is significantly slower with respect to query response times than an SSD-backed database. SSD-based storage also may outperform data lake storage in terms of read/write performance, depending on the query characteristics. As will be appreciated by those skilled in the art, there is a significant tradeoff between SSD-based storage and data lake storage in terms of cost and operational efficiencies.

One consideration underlying such a layered storage approach is the proper distribution of the data between operational database and data lake. Storing all data in the operational database will quickly result in high storage costs and query performance problems. The opposite layout is to buffer incoming data in the operational database only shortly and to move it then directly to the data lake. Then the load of operational queries will be run on the data lake. This will result in low query performance as the data lake cannot provide the same query latencies as the operational database and the storage layout may not be designed for operational queries.

One common approach is to delete data according to temporal data retention rules. For example, if data retention is set to ten days, then data being older than ten days will be regularly deleted, e.g., each day. However, this approach may severely limit the scope of follow-up applications as they cannot work with long-term data. Additionally, the relevance of the data is not taken into account; thus, data is deleted regardless of whether it is important for follow-up applications. Conversely, irrelevant data may be kept longer than necessary or appropriate.

Furthermore, this approach requires human interaction and expert knowledge about the setting of the retention policies. For use cases having a small number of devices with a moderate update frequency, the retention timeframe could be one month or more and the operational database can still cope with the query load and will not exceed storage limits. For use cases having a six-digit number of devices with a high update frequency, a retention timeframe of one week could already exceed the processing limits and storage capabilities of the operational database. Additionally, the characteristics of a use-case may evolve over time, leading to a significantly higher number of devices being managed. Thus, a suitable setting of the retention timeframe is challenging and potentially error prone.

As those skilled in the art will appreciate, the approach may be considered a naïve approach in the sense that it does not take the relevance of data into account. Depending on the use case, status data of some devices may be frequently queried, potentially over longer periods, while status data of other devices is seldomly queried. But the temporal retention policy cannot distinguish which data set is more relevant. It simply deletes data according to the temporal policy, regardless of whether or not it is frequently queried.

Generally speaking, an IoT platform manages IoT devices and their data by connecting a device and processing its data. The platform can be either deployed in the cloud or "on the edge." An edge deployment in this instance refers to running the platform as a single-server variant. Edge deployments are often physically close to the devices they monitor, e.g., in the shop floor, to provide low latency between data transmission and analysis. For edge deployments, it oftentimes is difficult to horizontally scale the capacities of the corresponding machine as it can require downtime and physical replacement, e.g., of a hard disk or RAM. Thus, for edge deployments, it can be even more important to have proper strategies for dealing with the potentially large amounts of generated data.

An IoT platform typically connects the devices using source connectors. Once the connection is established, status updates of the device are continuously received and stored. The IoT platform comprises an operational database that stores the incoming status data. The system uses data retention policies to limit the size of the operational database. The policies are evaluated regularly and delete old data from the operational database.

The IoT platform can additionally connect to a data lake and store old data for long-term archiving. The offloading of data from the operational database to the data lake is triggered regularly by the system. The data lake will not contain the latest data; there is typically a gap between latest data in the operational database and in the data lake. However, data in the operational database and the data lake will overlap, i.e., the same data can be stored in both layers. While it will be eventually removed from the operational database, it is kept in the data lake to build up a long-term archive.

The federation of those two storage layers for device data is aligned with the query requirements of follow-up applications. The operational database is queried for operational purposes, e.g., to detect recent problems or to capture the latest status of devices. The data lake store is queried for analytical purposes covering potentially weeks, months, or years of data, e.g., to generate statistics for summary reports. For that reason, data in the data lake may be stored in an analysis-friendly format, using Apache Parquet for example. When developing a query, the user must know whether to query the operational database or the data lake. It may be assumed that queries use in the majority of cases a window to focus on subsets of data. Such a window can be either temporally defined (like the last hour or last month) or count-based (like the last 100 elements). The latter count-based setting may even be used as default by the system if the query does not define an explicit window. Such a default window prevents running computationally-intense queries that involve potentially scanning the complete table. The following text describes operational queries running against an operational database, in contrast to analytical queries that run against the data lake.

Performance-wise, the operational database is superior to the data lake, but lacks the large-scale storage capabilities of a data lake. Regarding the management and distribution of data within these two layers, two mechanisms are leveraged. The data retention mechanism is responsible for deleting old data from the operational database and the offloading mechanism is responsible for replicating data from the operational database to the data lake.

The device data and associated device management information is typically not stored in one big table but spread over several tables. For the sake of illustration, we use the following exemplary tables throughout this document:

Measurements: This table is configured for storing device status updates, denoted as measurements. For example, these can be temperature, position, pressure measurements, or combinations thereof. Depending on the use case, several measurement tables can be defined to separate, for example, device groups or applications.

Alarms: This table is a higher-order table that is configured for storing alarms (and possibly all alarms) being raised. An alarm typically is raised when device data does not match expected values, e.g., the temperature is too high. Corresponding alarm rules are defined and evaluated within the IoT platform.

Inventory: This table is configured for storing metadata of the devices. Device metadata can refer, for example, to device registration time, firmware version, vendor, or combinations thereof.

U.S. Pat. No. 10,089,362 discloses systems and methods for investigating event streams in Complex Event Processing applications. The solution is useful for CEP developers dealing with streams having unknown characteristics. It computes characteristics of an event stream and related analysis patterns seen so far. For that purpose, queries are analyzed, and stream characteristics are identified. As a result, a stream profile is provided, which users can utilize for query development. This work utilizes query and data characteristics, and is helpful for supporting CEP developers when investigating unknown streams.

U.S. Publication No. 2021/240347 discloses a method for replicating multiple data objects from a first storage location on a first computer system to a second storage location at a second computer system. Some of the multiple data objects are identified in accordance with a retention policy, to continue storing at the first storage location. The retention policy is arranged to specify that a greater number of references by applications to a given object corresponds to a higher priority for the given object remaining stored at the first storage location. The identified some of the multiple data objects is selected to remain stored at the first storage location, such that the data objects that do not remain stored at the first storage location remain stored at the second storage location.

U.S. Pat. No. 10,958,536 discloses a data management policy that specifies a data transmission policy obtained by the first IoT component. A data retention policy, a data retirement policy, and a data processing policy for a processing of the sensor data by several IoT components comprises the first IoT component and one or more additional IoT components. The sensor data is processed based on the obtained data management policy. The several IoT components comprises an edge device that aggregates a portion of the sensor data from several sensor devices, and a backend storage device.

U.S. Pat. No. 11,301,419 discloses that data retention requests associated with actions are received for datasets. The data retention requests are evaluated to determine a set of active data retention requests associated with active actions. The active actions are consolidated into aggregate actions. A consolidated work object is generated for aggregate action. The consolidated work object comprises a work item type corresponding to the aggregate action and a dataset identifier corresponding to a dataset. An indication of the generated consolidated work objects is transmitted in response to a work processor retrieval request to a work processor which processes the generated consolidated work objects in accordance with the configurable data retention policy.

U.S. Pat. No. 11,115,793 discloses a processing system for transmitting data to a first network element remote from the premises. The first network element comprises a femtocell and does not receive human traffic communications (HTC), and transmits the data to a second network element for aggregation and subsequent transmission to a cloud data facility comprising cloud storage, where a data path from the device to the first network element, from the first network element to the second network element, and from the second network element to the cloud data facility comprises a secure data path.

Certain example embodiments improve conventional data retention policies and thereby overcome the above-mentioned and/or other technical disadvantages.

Certain example embodiments provide a computer-implemented method for data storage management. The method may be carried out by an Internet of Things platform. The Internet of Things platform may have access to an operational database and/or to a long-term database. The long-term database may be a data lake. Both databases may carry one or more tables for storing device-related data emitted from devices connected to the Internet of Things platform.

The method may comprise executing at least some of the following steps, potentially regularly or repeatedly. The method may comprise receiving and storing device-related data in entries of tables of the operational database. Tables may be associated with respective devices. Table entries may be associated with respective dates of entry. The method may comprise monitoring at least one table of the one or more tables of device-related data stored in the operational database to obtain load statistics. The method may comprise offloading data from the operational database by replicating the data to the long-term database. The method may comprise tracking queries against tables of the operational database to obtain query statistics. The method may comprise setting up one or more table cleanup rules. The one or more table cleanup rules may determine timeframes within which data stored in entries of respective tables of the operational database are to be deleted, e.g., based on a date of data entry, said timeframes referred to as expiry timeframes. The method may comprise carrying out, referred to as retention run, one or more cleanup rules currently set up, e.g., based at least in part on the load statistics and/or the query statistics.

Accordingly, aspects of certain example embodiments implement the technical concept of dynamically adapting the data retention policies of an IoT platform by introducing a framework for dynamically adapting data retention in the operational database while additionally leveraging data lake storage capabilities. The framework will keep relevant data as long as necessary in the operational database, which ensures proper query performance for follow-up applications. Less frequently queried data will be automatically deleted from the operational database while ensuring that it was replicated to the data lake beforehand. The framework is designed to conduct the required adaptations of the data retention automatically so that human interaction is not required, or at least is significantly reduced, which helps avoid additional potential operational difficulties (including possible time delays) that could be associated with manual interventions.

The following briefly summarizes some of the technical benefits of dynamic data retention according to aspects of certain example embodiments:

High query performance: By continuously monitoring the table volumes and/or the queries, the certain example embodiments may dynamically help ensure that relevant and frequently queried data is stored in the operational database. Having the most relevant data in the operational database helps ensure a high query performance for follow-up applications.

Size of operational database: Certain example embodiments may delete less relevant data regularly or repeatedly from the operational database. Therefore, the database is less likely to (and hopefully will not exceed) storage limits. This is particularly relevant in edge deployments of the IoT platform, where upgrades of the storage capacities typically require downtimes, if possible at all.

Lower operation costs: Human interaction to define data retention rules, monitor the operational database health, and adapting the retention rules, may be significantly reduced as certain example embodiments dynamically adapt and execute the data retention.

High degree of adaptation: Certain example embodiments may automatically adapt the retention if the characteristics of the use case are changing in terms of sudden increase of data volumes, many new ad-hoc queries, or more frequently executed queries.

In certain example embodiments, the device-related data stored in the operational database may comprise device status updates, denoted as measurements, e.g., comprising temperature, position, and/or pressure measurements. Such device-related data may comprise raw device data and/or derived data, such as alarms being raised, e.g., due to a violated threshold, or other events.

In certain example embodiments, load statistics may comprise, e.g., for each table of the one or more tables of the operational database: one or more input data rates, and/or a number of entries and one or more entry sizes, and/or a table size.

In certain example embodiments, query statistics may comprise (e.g., for each query against a table of the one or more tables of the operational database): a query result size, and/or a query runtime, and/or a query frequency, and/or one or more query submission times, and/or a timeframe targeted by a query, and/or tables addressed in the query.

In certain example embodiments, a retention run may be carried out at predetermined times, e.g., multiple predetermined times, potentially with a recurrent time interval, and potentially at a time interval matching a fraction of a day. A retention run may also be carried out when it is determined that an overall size allocated by the operational database is approaching a predetermined upper limit and/or query response times of the operational database are deteriorating, based on current load statistics and/or current query statistics.

In certain example embodiments, a retention run to be carried out may be skipped if the load of the operational database is currently high and the volume of the operational database is not yet close to predetermined storage boundaries. Load may be measured using system metrics such as CPU and/or memory allocation of the database(s) and/or by comparing response times of recurring queries. A high load of the operational database may be indicated by a large number of queries and/or by long runtimes of the current queries.

In certain example embodiments, a table of the one or more tables of the operational database may be a part of (e.g., processed with) the retention run to be carried out based on a predetermined relevance criterion. For example, the table may not be part of the retention run, i.e., it may be skipped by the retention run, if the table is considered to be relevant enough to be better kept in the operational database, based on the relevance criterion. On the other hand, if the table's relevance is considered less relevant based on the relevance criterion, the table will be processed by the retention run. The relevance criterion may comprise deciding whether a cleanup rule set up for said table has an expiry timeframe that does not intersect any of one or more second timeframes determined on the basis of current query statistics. The current query statistics may be confined in time, e.g., to data of any one of the last 1 to 4 weeks, and the last 1 to 12 months.

In certain example embodiments, said one or more second timeframes may be determined by collecting, e.g., in a plurality of buckets associated with timeframes represented by elements of a predetermined partition of a predetermined time interval, for each bucket the number of queries against said table and/or their median runtime in the timeframe the bucket is associated with, and/or by identifying said one or more second timeframes associated with buckets respectively having a lowest number of queries and/or a shortest median query runtime of the plurality of buckets. Said predetermined time interval may be the duration of a day.

As will be appreciated, certain example embodiments help address the dynamic adaptation of data retention in IoT platforms.

Certain embodiments may be based on at least a subset of the following technological components:

Monitoring and Analysis of Input Data Rates and Queries

For a dynamic adaptation of data retention, certain example embodiments may track the data volumes managed in the operational database and analyze the relevance of this data for the users.

The analysis of the data volumes may refer to tracking, e.g., on a per table basis, the number of elements and/or statistics on the element sizes over time. This information can be used, e.g., to estimate the storage requirements per table, and/or detect anomalies or significant changes in data arrival and element sizes, and/or forecast expected data volumes.

The analysis of queries may refer to tracking the incoming queries over time. This information can be used, e.g., to identify frequently queried tables and less frequently queried ones, and/or find regularly executed queries vs. one-time queries, and/or distinguish between operational queries running against the operational database and analytical queries running against the data lake, and/or identify long-running and short-running queries.

Computation of Data Relevance

Combining the analysis of input data and queries may provide insights into the relevance of the different tables. For each of these tables the analysis results can be used to derive the relevance of different time periods of the table for operational queries. For example, one device group managed in a measurements table may be frequently queried for the last hour of data and once a day queried for the last week. Then the last hour timeframe would have a high relevance and the last week timeframe a low one.

The relevance evaluation may be regularly or repeatedly executed to capture changes in the data and in the query profiles.

Dynamic Execution of Data Retention

Given the relevance information for all tables, the system may dynamically execute data retention policies. Target metrics for a successful dynamic data retention may be a moderate storage volume of the operational database to limit the costs, and/or frequent queries being executed with a good performance to satisfy customer requirements.

Using the relevance information, the IoT platform may investigate, e.g., on a per table basis, which timeframes are most important in terms of having the highest relevance. Older data beyond the relevant timeframes can be deleted.

The system can take additionally the storage requirements of a table into account. For example, if a table only stores small-sized entries and the arrival rate of input data is low, then for this table longer time periods can be stored in the operational database.

Alignment of Operational Database and Data Lake Storage

The data lake serves as long-term storage container. The IoT platform may regularly or repeatedly offload data from the operational store to the data lake.

The dynamic data retention approach may also take the contents of the data lake into account. It may ensure that data is only deleted from the operational database if it was already offloaded to the data lake. This approach helps ensure that no data gets lost.

It may also take into account a scenario where query characteristics are changing, and not yet often queried data suddenly is more often queried for operational purposes. In case the operational database does not store this data anymore, the corresponding subsets of data can be retrieved from the data lake and copied back to the operational database.

These mechanisms ensure that the system can dynamically adapt to changing use cases and query characteristics.

Certain example embodiments may also provide a data processing apparatus or system comprising means for carrying out any of the methods disclosed herein. The apparatus or system may comprise means for connecting to the Internet. Certain example embodiments may also provide a computer program comprising instructions to cause the processing apparatus or system to carry out any of the methods disclosed herein. Certain example embodiments may also provide a non-transitory computer readable medium tangibly storing such a computer program such that, when executed, the computer program causes the processing apparatus or system to carry out any of the methods disclosed herein.

BRIEF DESCRIPTION OF THE DRAWINGS

The disclosure may be better understood by reference to the following drawings.

DETAILED DESCRIPTION OF CERTAIN EXAMPLE EMBODIMENTS

Certain example embodiments will now be described. The person skilled in the art will appreciate that the aspects described below may be provided independently or in suitable combinations to provide still further embodiments.

Basic Workflow of Dynamic Retention

Figure 1:
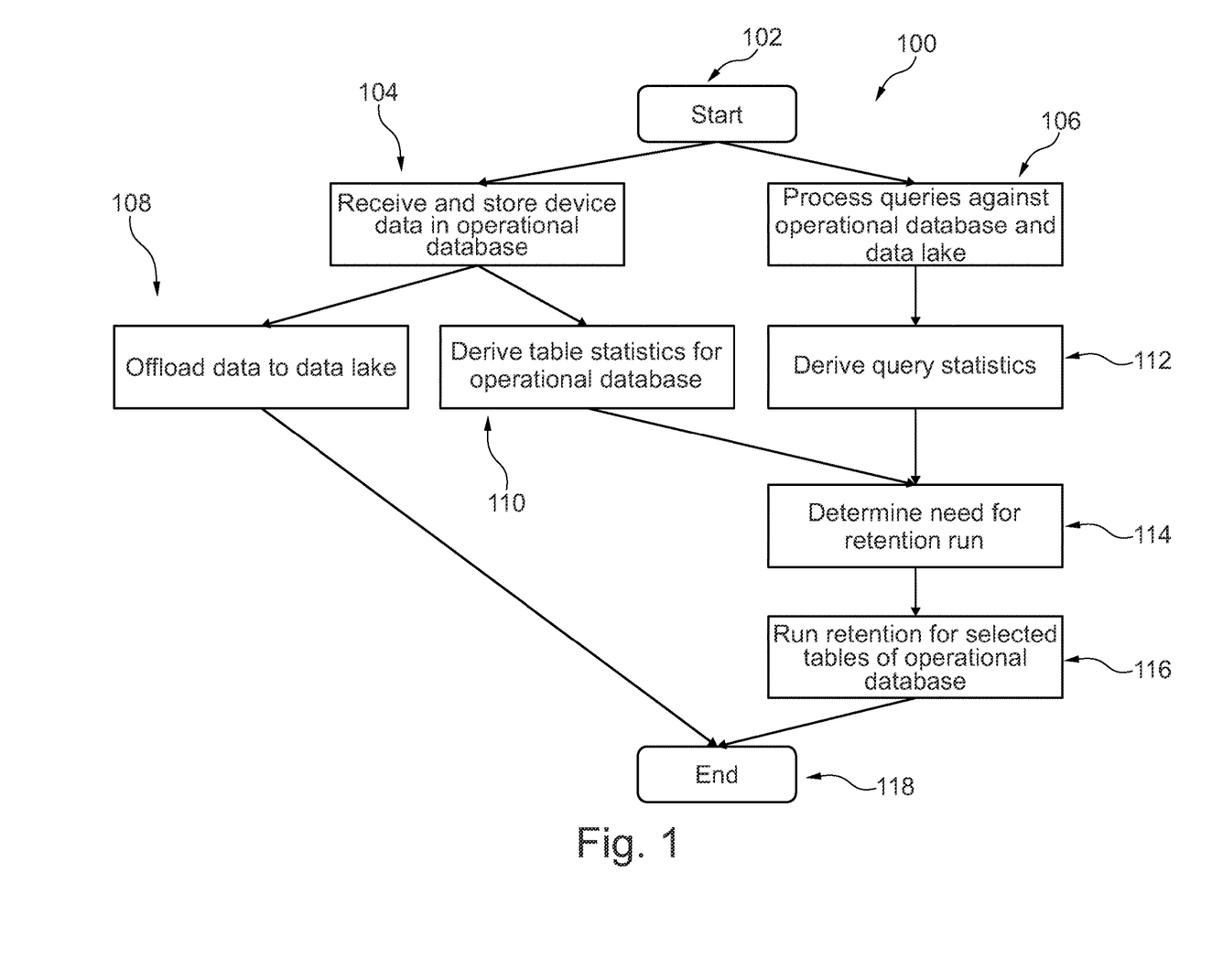
FIG. 1: shows a workflow summarizing steps of dynamic adaptation of data retention in accordance with certain example embodiments.

FIG. 1 shows a workflow 100 summarizing the steps of a dynamic adaptation of data retention in accordance with certain example embodiments.

The process starts at step 102. In step 104, device data is received and stored in an operational database. In step 106, queries against the operational database and a data lake are processed. It will be appreciated that steps 104 and 106 may be performed subsequently in the indicated order, in a different order, or concurrently. Data is offloaded to the data lake in step 108. In step 110, table statistics (which are load statistics in certain example embodiments) for the operational database are derived. In step 112, query statistics are derived. Also steps 110 and 112 may be performed concurrently or essentially independently of each other, as well as concurrently with step 108. The process determines the need for a retention run in step 114. A retention run is performed for selected tables of the operational database in step 116. The method ends in step 118.

An example embodiment implementing dynamic management of data retention will now be described.

Architecture of Dynamic Data Retention in an IOT Platform

Figure 2:
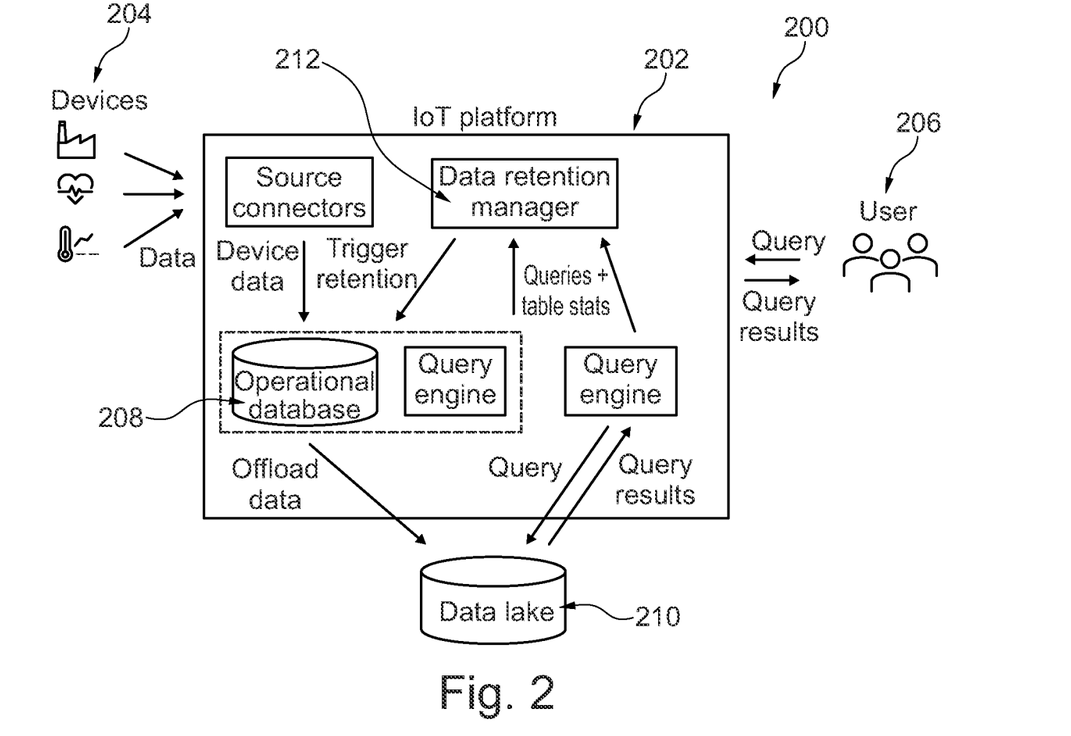
FIG. 2: shows an architecture of dynamic data retention within an IoT platform in accordance with certain example embodiments.

FIG. 2 shows an exemplary architecture 200 for dynamic data retention within an IoT platform 202, its components, and their interaction patterns in accordance with certain example embodiments. The architecture serves as a blueprint that can be adapted according to the overall architecture of an IoT platform. It will be appreciated that the devices 204 typically will include processing resources (e.g., at least one processor and a memory), as well as sensors or the like, and will be communicable with the IoT platform 202 via a wired or wireless connection (e.g., over a network connection such as the internet). The IoT platform likewise will include processing resources (e.g., at least one processor and a memory), wired or wireless connections to the devices, etc. The processing resources of the IoT platform 202 help provide the functionality described below in connection with the FIG. 2 blocks. They also help provide a querying interface for users 206.

Devices 204 are connected via source connectors and regularly transmit their data to the platform 202. The incoming data is stored in the operational database 208. Regularly or repeatedly executed offloading jobs replicate the latest data from the operational database 208 to the data lake 210. The operational database 208 and the data lake 210 are part of the IoT platform 202 in the illustrated embodiment, but this need not be the case. The operational database 208, the data lake 210, or both, may also be located external to the IoT platform 202 in different example embodiments.

Users 206 or follow-up applications run queries against the platform 202. In certain example embodiments, they run the query against the operational database 208, and in certain example embodiments they run it against the data lake 210. For each option, a separate query engine is denoted in this architecture. Alternatively, one query engine can run queries against both the operational database 208 and the data lake 210.

The data retention manager 212 resides in the platform 202 and regularly retrieves the latest queries and statistics on the tables in the operational database 208. It uses this information to evaluate when a retention run is necessary. If it is necessary, it triggers a retention run so that old data is deleted from the operational database 208. To prevent data from being completely deleted from the platform 202, the retention manager 212 can optionally trigger offloading runs, which helps ensure that the data to be deleted has been replicated to the data lake 210 beforehand.

Components of Data Retention Manager

Figure 3:
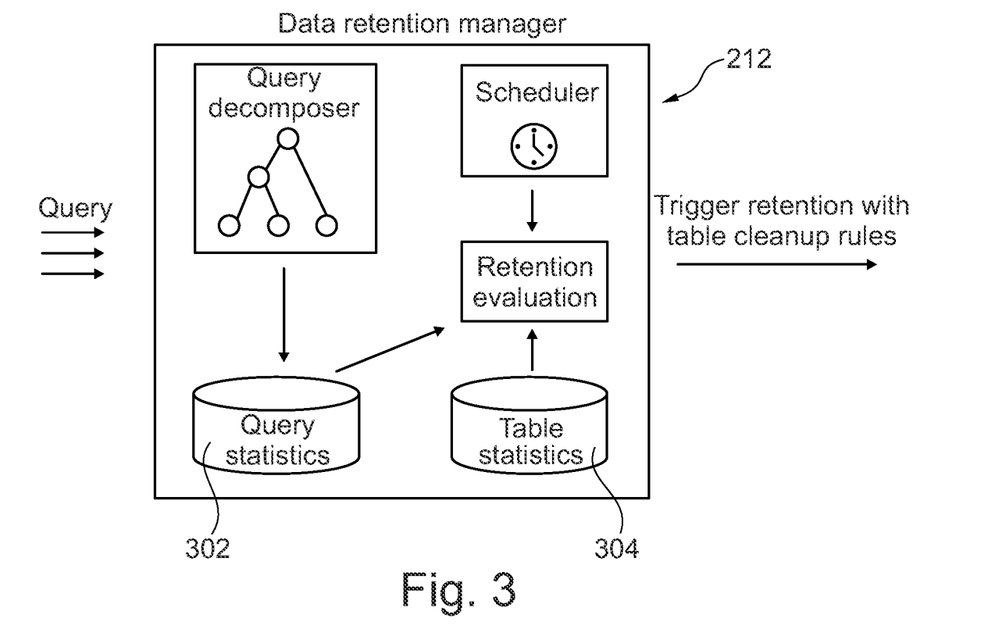
FIG. 3: shows an embodiment of a data retention manager and its components in accordance with certain example embodiments.

FIG. 3 shows an embodiment of a data retention manager 212 of FIG. 2 and its components in accordance with certain example embodiments.

One of these components is a query decomposer which processes newly received queries and decomposes them to derive relevant query statistics 302, which may be load statistics. This information is then stored internally in a query statistics table.

The query statistics table stores one (or more) rows per incoming query. It has the following schema in certain example embodiments, while alternative embodiments may involve some of the following and/or other factors:

Id: an internal identifier

Query string: the actual query being executed

Queried table: the table(s) of the operational database being queried; if more than one table is queried, for each those tables a new entry is produced Queried timeframe: the oldest point in time the query refers to Query submission time: the point in time the query was registered in the system Query runtime: the time required to execute the query For example, the table could contain the following entries:

| Id | Query string | Queried table | Queried timeframe | Query submission time | Query runtime (ms) |
|---|---|---|---|---|---|
| 245 | SELECT * FROM Alarms WHERE creationTime > {ts '2020 Feb. 8 15:00:00.000'} | Alarms | 2 hours | 2020 Feb. 8 17:00:00.000 | 1708 |
| 246 | SELECT AVG(temperature) FROM Measurements WHERE creationTime > {ts '2020 Feb. 1 00:00:00.000'} | Measurements | 1 week | 2020 Feb. 8 17:13:01.231 | 5412 |
| 247 | ... | ... | ... | ... | ... |

SQL is used as query language in this example for illustration purposes; other query languages can be supported analogously.

The table can be used to gain further insights into which queries access which tables within which timeframe:

Determine how often each table of the operational database has been queried in a respective timeframe, e.g., in the last week Normalize the query strings and group them so that regularly executed queries can be determined as well as one-time queries Identify the most expensive queries in terms of runtime in a respective timeframe and check which tables are involved Different (e.g., more or less complex) analysis techniques can be used to support the decision for starting a retention run. For that purpose, each table of the operational database 208 is considered separately. Then each query run against that table is considered, more specifically, in connection with the query submission time and the query runtime. This establishes a univariate time series, with submission time as an independent variable and query runtime as a dependent variable. The time series models a load profile on the table over time. The more queries are received in a timeframe and the longer the response times are, the more load is currently on the table.

Figure 4:
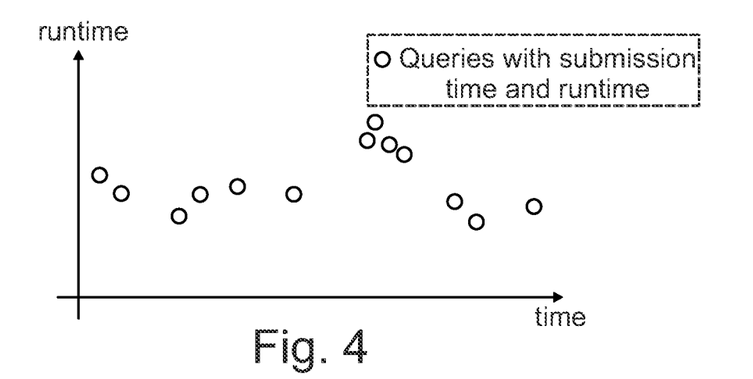
FIG. 4: shows an exemplary plot of a time series of queries against a table.

FIG. 4 shows an exemplary plot of a time series of queries accessing a table.

By investigating the "seasonality" of the time series and the according query runtimes, typical load patterns on the table can be derived. For example, each afternoon between 2 and 5 pm the inventory table is under heavy load, indicated by many queries in that timeframe and long query runtimes. This might be due to a follow-up application compiling within this timeframe reports on the devices managed in the inventory. Conversely, repetitive timeframes can be identified where the load on the table is low, indicated by a low number of queries and low query response times. These repetitive timeframes of low activity are of special interest as they are good candidates for a retention run. "Seasonality" thus should be understood to refer to a particular definable time period rather than referring strictly to the calendar-based "seasons" of summer, fall, winter, and spring.

The following algorithm can be used to determine the seasonality for a table:

Given:
  $T=\{(t_i, r_i),$ positive integer $i\}$ the set of all queries with query submission time $t_i$ and query runtime $r_i$
  $B=\{b_i, i=1, \ldots, 24\}$ an hour-based partition of the day with $b_i$ denoting the timeframe [i−1, i)

Algorithm:
For Each Entry in T:
  Determine the bucket b containing $t_i$;
  Append bucket information to entry $(t_i, r_i, b_i)$;
  Group all entries in T by bucket id;
For Each Bucket:
  Count the number of queries associated with the bucket;
  Compute the median of the query runtimes for queries associated with the bucket;

Result:
  The buckets $b_1, \ldots, b_{24}$ with the number of queries and the median query runtimes within the corresponding timeframe;

For example, the current bucket list might resemble the following:

| Bucket | Number of queries | Median query runtime |
|---|---|---|
| $b_1$ [00:00, 01:00) | 24 | 3.26 |
| $b_2$ [01:00, 02:00) | 38 | 4.3 |
| $b_3$ [02:00, 03:00) | 19 | 1.29 |
| ... | | |

Figure 5:
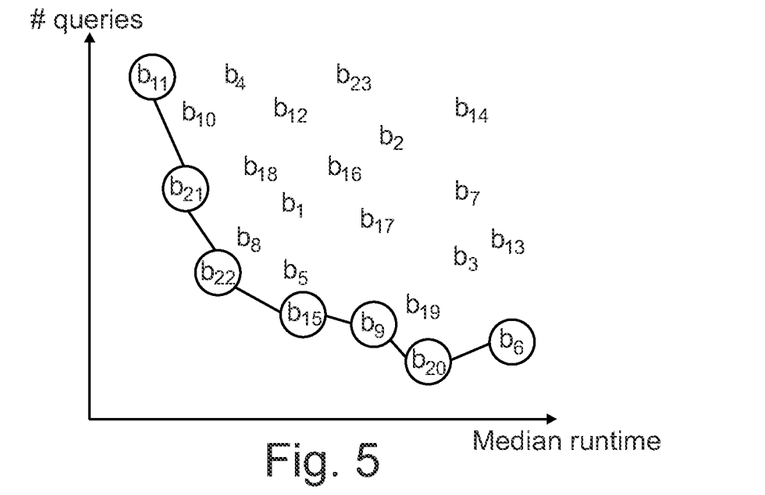
FIG. 5: shows an exemplary plot of an example for buckets involved in a skyline query.

This provides a list of candidates with potential timeframes for a retention run. Finding reasonable candidates given above bucket list can be implemented by running a skyline query. The skyline query determines those buckets, where no other bucket is better in terms of lower number of queries or lower median query runtime. FIG. 5 provides an example for the buckets on the skyline.

Given the bucket lists for each table of the operational database 208, the data retention manager can assess when a retention run for a table is reasonable.

In order to focus on recent status, the bucket list statistics can be confined to data of the last weeks or months.

Another internal table of the query decomposer tracks the volumes and element size statistics of the tables in the operational database 208 over time. For that purpose, each table in the operational database 208 is regularly examined with respect to how much memory it allocates and how many elements it stores. The resulting table is defined as:

Evaluation time: point in time where the table has been analyzed
Overall size: memory allocated by the table
Element number: number of elements in the table
Median element size: median of the size of an element in the table Retention Evaluation Component A scheduler regularly or repeatedly triggers the retention evaluation component. This component then decides whether a retention run is necessary. For that purpose, it investigates the size of the operational database 208 and the query runtimes, using the query and size statistics tables. If the query response times have deteriorated or the overall size allocated by the operational database approaches a high or even critical level, the component plans a retention run.

For that purpose, it examines the temporal relevance of data for each table in the operational database 208 as well as the table volumes over time. Using that information, it determines table cleanup rules defining which timeframes of data are to be deleted for which table. A table cleanup rule defines for a table a time interval for which data is to be deleted, e.g., data being older than one month, based on a day of data entry, etc.

The approach for determining the temporal relevance of the data is very similar to the approach for determining the buckets. A set of timeframes is defined, e.g., the last hour, the last 100 elements, the last day, the last week, etc. Then for each query, it is determined which timeframe it is associated with. Grouping by timeframe delivers groups of queries for the different frames. For each group the number of queries can be computed.

For example, the result might resemble the following:

| Window | Number of queries |
|---|---|
| Last minute | 5 |
| Last hour | 38 |
| Last two hours | 19 |
| ... | |

With this table, the longest timeframe can be determined so that a predefined percentage of all queries use smaller timeframes. For example, when selecting the last month as timeframe, 95% of all queries use timeframes smaller than one month. This approach allows for a load-dependent selection of a timeframe, so that the deletion of data older than this maximum timeframe only affects a small number of queries. Combining this with the table statistics 304 gives an estimate of how much memory will be released when the data is deleted. For each table of the operational database 208, these table cleanup rules can be defined, which are based on

- a timeframe, e.g., the last week
- the query coverage percentage, e.g., 95% of all queries are in smaller timeframes
- the overall number of queries in smaller timeframes
- an estimate of how much memory would be released when deleting older data Next, the system checks for which table data is to be deleted. Again, the query numbers are leveraged. The more queries refer a table, the more relevant the table is. Thus, when selecting a table for running a retention, the number of queries compared to those of other tables is also taken into account. This ensures that the retention is aligned with the current table access pattern.

Finally, a retention run is triggered with the selected table cleanup rules.

Scheduling End Execution of Retention

A "naïve" data retention approach is to run the retention once a day with a fixed timeframe, e.g., delete data older than three weeks, for all tables. One drawback of this approach, however, is that the operational database 208 could be under a heavy load while running the retention as data from all tables is deleted and corresponding indices might need to be adapted. Additionally, queries might run against the table within that timeframe.

The scheduling component of the data retention manager 212 can implement a more fine-grained approach. The scheduler can be triggered more often per day, e.g., every two hours. Instead of executing all table cleanup rules in one row with the risk of high load, the system can choose a few cleanup rules to run, aligned with the current load on the database 208. If the database load is currently high and the database is not yet close to the storage boundaries, the current retention run can be skipped. If the load is moderate or the database approaches the storage boundaries, the retention can be executed using the most relevant cleanup rules. The database load can be measured with system metrics like CPU and memory allocation of the database or by comparing response times of recurring queries.

Regarding the tables to be cleaned up, the selection of table cleanup rules can take the query profiles into account. Using the query profiles as discussed beforehand, certain example embodiments determine timeframes when a table is frequently queried and, vice versa, when it is most likely not queried. Thus, when planning a retention run, tables most likely to be queried soon will not be considered in this run or only considered if they have a high volume.

Before running a table cleanup rule, the retention manager 212 also checks whether the data to be deleted is already offloaded to the data lake 210. If not, either the rule will not be executed, or an offloading run is triggered beforehand.

Figure 6:
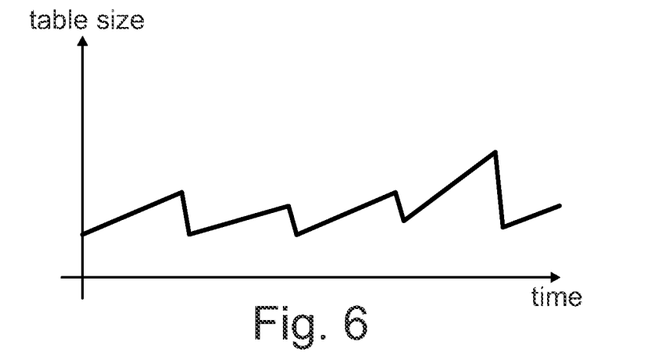
FIG. 6: shows an exemplary plot of table sizes over time of tables subjugated to dynamic data retention.

By executing these retention algorithms in a regular manner, the tables will have a moderate size while providing a good query performance. The size of the tables over time will show a sawtooth-shaped graph, with each decline being due to a retention run. FIG. 6 shows an exemplary plot of table sizes over time of tables subjugated to dynamic data retention in accordance with certain example embodiments.

Computer Implementation

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. These method steps may be implemented in connection with computer-implementable instructions, e.g., instructions that may be arranged in one or more modules or programs and that may be performed or executed by at least one processor or the like.

Certain example embodiments may be implemented on a computer system. The computer system may be a local computer device (e.g., personal computer, laptop, tablet computer, or mobile phone) with one or more processors and one or more storage devices or may be a distributed computer system (e.g., a cloud computing system with one or more processors and one or more storage devices distributed at various locations, for example, at a local client and/or one or more remote server farms and/or data centers). The computer system may comprise any circuit or combination of circuits. In one embodiment, the computer system may include one or more processors which can be of any type. As used herein, processor may mean any type of computational circuit, such as but not limited to a CPU, microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), or any other type of processor or processing circuit. Other types of circuits that may be included in the computer system may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system may also include a display device, one or more speakers, and a keyboard and/or controller, which can include a mouse, trackball, touch screen, voice-recognition device, or any other device that permits a system user to input information into and receive information from the computer system.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on the implementation, certain example embodiments can be implemented in hardware and/or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Certain example embodiments comprise a data carrier having electronically readable control signals, which are capable of cooperating with a programmable computer system, such that one of the methods described herein is performed.

Certain example embodiments can be implemented as a computer program product with a program code, the program code being operative for performing one of the methods when the computer program product runs on a computer. The program code may, for example, be stored on a machine-readable carrier.

Certain example embodiments comprise the computer program for performing one of the methods described herein, stored on a machine-readable carrier.

In other words, an embodiment where a computer program having a program code for performing one of the methods is contemplated herein, and the computer program runs on a computer.

In certain example embodiments, a storage medium (or a data carrier, or a computer-readable medium) comprises, or has stored thereon, the computer program, which performs one of the methods described herein when it is performed by a processor. The data carrier, the digital storage medium or the recorded medium are typically tangible and/or non-transitionary. In certain example embodiments, an apparatus comprises a processor and the storage medium.

In certain example embodiments, a data stream or a sequence of signals represents the computer program for performing one of the methods described herein. The data stream or the sequence of signals may, for example, be configured to be transferred via a data communication connection, for example, via the internet.

In certain example embodiments, processing means, for example, a computer or a programmable logic device, is configured to, or adapted to, perform one of the methods described herein.

In certain example embodiments, a computer has installed thereon the computer program for performing one of the methods described herein.

In certain example embodiments, an apparatus or a system is configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver. In this sense, the term "system" incorporates an "apparatus" where components may be integral (e.g., in a common housing) or separate from one another.

In certain example embodiments, a programmable logic device (for example, a field programmable gate array) may be used to perform some or all of the functionalities of the methods described herein. In certain example embodiments, a field programmable gate array may cooperate with a microprocessor in order to perform one of the methods described herein. In certain example embodiments, the methods are performed by any hardware apparatus.

What is claimed is:

1. A computer-implemented method for dynamically adapting data retention processes on an Internet of Things platform having access to an operational database and to a long-term database, the operational database and the long-term database each including one or more tables for storing device-related data emitted from devices connected to the Internet of Things platform, the method comprising:
   (a) receiving and storing device-related data in entries of tables of the operational database, wherein tables are associated with respective devices, and table entries are associated with respective dates of entry;
   (b) generating load statistics by monitoring at least one table of the one or more tables of device-related data stored in the operational database;
   (c) offloading data from the operational database by replicating the data to the long-term database;
   (d) generating query statistics of database queries based on tracking database queries that are executed against tables of the operational database;
   (e) setting up one or more table cleanup rules determining expiry timeframes within which data stored in entries of respective tables of the operational database are to be deleted, based on a date of data entry; and
   executing a plurality of retention runs, where each of the plurality of retention runs includes executing, for a corresponding retention run, one or more cleanup rules, wherein the execution of the plurality of retention runs is based on the load statistics and/or the query statistics,
   wherein a table of the one or more tables of the operational database is subjected to the retention run to be executed based on a predetermined relevance criterion,
   wherein the relevance criterion comprises deciding whether a cleanup rule set up for said table has an expiry timeframe that does not intersect any of one or more second timeframes determined based on current query statistics,
   wherein said one or more second timeframes are determined by:
      collecting, in a plurality of buckets associated with timeframes represented by elements of a predetermined partition of a predetermined time interval, for each bucket the number of queries against said table and their median runtime in the timeframe the bucket is associated with, and
      identifying as said one or more second timeframes associated those buckets respectively having a lowest number of queries and/or a shortest median query runtime of the plurality of buckets.

2. The method according to claim 1, wherein the device-related data stored in the operational database comprises data indicative of device status updates.

3. The method according to claim 2, wherein the data indicative of device status updates reflects temperature, position, and/or pressure measurements.

4. The method according to claim 1, wherein the load statistics comprise for each table of the one or more tables of the operational database: one or more input data rates, a number of entries and one or more entry sizes, and/or a table size.

5. The method according to claim 1, wherein the query statistics comprise for each query against a table of the one or more tables of the operational database: a query result size, a query runtime, a query frequency, one or more query submission times, a timeframe targeted by a query, and/or tables addressed in the query.

6. The method according to claim 1, wherein retention runs are executed at predetermined times.

7. The method according to claim 1, wherein retention runs are executed when it is determined that an overall size allocated by the operational database is approaching a predetermined upper limit and/or query response times of the operational database are deteriorating, based on current load statistics and/or current query statistics.

8. The method according to claim 6, wherein a given retention run to be executed is skipped provided that the load of the operational database is currently high and the volume of the operational database is not yet close to predetermined storage boundaries.

9. The method according to claim 8, wherein a high load of the operational database is indicated by a large number of queries and/or by long runtimes of the current queries.

10. The method according to claim 8, wherein a high load of the operational database is indicated by a number of queries being above a first predetermined threshold and/or by runtimes of the current queries exceeding a second predetermined threshold.

11. The method according to claim 1, wherein execution of at least one of the plurality of retention runs is based on the load statistics and the query statistics, wherein (a)-(e) are performed multiple times over the plurality of retention runs.

12. A non-transitory computer readable storage medium storing instructions that are executable by a processor of by an Internet of Things platform to perform operations, the Internet of Things platform having access to an operational database and to a long-term database, the operational database and the long-term database each including one or more tables for storing device-related data emitted from devices connected to the Internet of Things platform, the operations comprising:
(a) receiving and storing device-related data in entries of tables of the operational database, wherein tables are associated with respective devices, and table entries are associated with respective dates of entry;
(b) generating load statistics by monitoring at least one table of the one or more tables of device-related data stored in the operational database;
(c) offloading data from the operational database by replicating the data to the long-term database;
(d) generating query statistics of database queries based on tracking database queries that are executed against tables of the operational database;
(e) setting up one or more table cleanup rules determining expiry timeframes within which data stored in entries of respective tables of the operational database are to be deleted, based on a date of data entry; and
(f) executing a plurality of retention runs, where each of the plurality of retention runs includes executing, for a corresponding retention run, one or more cleanup rules, wherein the execution of the plurality of retention runs is based on the load statistics and/or the query statistics,
wherein a table of the one or more tables of the operational database is subjected to the retention run to be executed based on a predetermined relevance criterion,
wherein the relevance criterion comprises deciding whether a cleanup rule set up for said table has an expiry timeframe that does not intersect any of one or more second timeframes determined based on current query statistics,
wherein said one or more second timeframes are determined by:
collecting, in a plurality of buckets associated with timeframes represented by elements of a predetermined partition of a predetermined time interval, for each bucket the number of queries against said table and their median runtime in the timeframe the bucket is associated with, and
identifying as said one or more second timeframes associated those buckets respectively having a lowest number of queries and/or a shortest median query runtime of the plurality of buckets.

13. An Internet of Things system having access to an operational database and to a long-term database, the operational database and the long-term database each including one or more tables for storing device-related data emitted from devices connected to the Internet of Things system, the Internet of Things system comprising:
a memory coupled to at least one processor configured to perform operations comprising:
(a) receiving and storing device-related data in entries of tables of the operational database, wherein tables are associated with respective devices, and table entries are associated with respective dates of entry;
(b) generating load statistics by monitoring at least one table of the one or more tables of device-related data stored in the operational database;
(c) offloading data from the operational database by replicating the data to the long-term database;
(d) generating query statistics of database queries based on tracking database queries that are executed against tables of the operational database;
(e) setting up one or more table cleanup rules determining expiry timeframes within which data stored in entries of respective tables of the operational database are to be deleted, based on a date of data entry; and
executing a plurality of retention runs, where each of the plurality of retention runs includes executing, for a corresponding retention run, one or more cleanup rules, wherein the execution of the plurality of retention runs is based on the load statistics and/or the query statistics,
wherein a table of the one or more tables of the operational database is subjected to the retention run to be executed based on a predetermined relevance criterion,
wherein the relevance criterion comprises deciding whether a cleanup rule set up for said table has an expiry timeframe that does not intersect any of one or more second timeframes determined based on current query statistics,
wherein said one or more second timeframes are determined by:
collecting, in a plurality of buckets associated with timeframes represented by elements of a predetermined partition of a predetermined time interval, for each bucket the number of queries against said table and their median runtime in the timeframe the bucket is associated with, and
identifying as said one or more second timeframes associated those buckets respectively having a lowest number of queries and/or a shortest median query runtime of the plurality of buckets.

14. The system according to claim 13, the operational database and/or the long-term database being external thereto.

15. The system according to claim 13, wherein the device-related data stored in the operational database comprises data indicative of device status updates.

16. The system according to claim 13, wherein retention runs are executed when it is determined that an overall size allocated by the operational database is approaching a predetermined upper limit and/or query response times of the operational database are deteriorating, based on current load statistics and/or current query statistics.

17. The system according to claim 13, wherein a given retention run to be executed is skipped provided that the load of the operational database is currently high and the volume of the operational database is not yet close to predetermined storage boundaries.

18. The system according to claim 17, wherein a high load of the operational database is indicated by a number of queries being above a first predetermined threshold and/or by runtimes of the current queries exceeding a second predetermined threshold.

19. The system according to claim 13, wherein execution of at least one of the plurality of retention runs is based on the load statistics and the query statistics,
    wherein (a)-(e) are performed multiple times for the plurality of retention runs.

* * * * *